United States Patent
Young et al.

[11] Patent Number: 5,938,175
[45] Date of Patent: Aug. 17, 1999

[54] QUICK CLEAN ORIFICE GATE

[75] Inventors: Lee Young; Joe Cather, both of Salina, Kans.

[73] Assignee: Salina Vortex Corporation, Salina, Kans.

[21] Appl. No.: 09/119,348

[22] Filed: Jul. 20, 1998

[51] Int. Cl.$^6$ ........................................................ F16K 3/00
[52] U.S. Cl. ........................................... 251/329; 251/326
[58] Field of Search ....................................... 251/329, 326

[56] References Cited

U.S. PATENT DOCUMENTS

| | | | |
|---|---|---|---|
| 2,426,392 | 8/1947 | Fennema | 251/329 X |
| 3,906,992 | 9/1975 | Leach | 251/329 X |
| 4,210,308 | 7/1980 | Sims | 251/329 X |
| 4,221,307 | 9/1980 | Peterson | 251/328 X |
| 4,483,514 | 11/1984 | Kennedy | 251/328 X |
| 4,842,004 | 6/1989 | Steinman | 137/68.19 |
| 4,938,250 | 7/1990 | Peterson . | |
| 5,255,893 | 10/1993 | Peterson . | |
| 5,449,146 | 9/1995 | Weagraff | 251/326 |
| 5,597,184 | 1/1997 | Brenes et al. | 285/24 |
| 5,791,632 | 8/1998 | Brenes | 251/329 |

OTHER PUBLICATIONS

Salina Vortex Corporation, Orifice Gate Brochure, Oct. 1997.

*Primary Examiner*—John Fox
*Assistant Examiner*—John Bastianelli
*Attorney, Agent, or Firm*—Shook, Hardy & Bacon

[57] ABSTRACT

A gate valve for controlling the flow of a material is provided which has first and second flange assemblies oriented adjacent to one another. Each of the flange assemblies has an opening through which the material can flow. A pair of load seals are placed between the first and second flange assemblies and a pair of pressure plates are placed between the load seals. A blade is located between the pressure plates and has an opening therein which is sized similarly to the openings in the first and second flange assemblies. The blade is movable between an open position such that the openings of the first and second flange assemblies are aligned with the opening of the blade, and a closed position such that the opening of the blade is not aligned with the openings of the first and second flange assemblies so that material is prevented from flowing past the blade. The first and second flange assemblies are coupled together with a coupling mechanism operable without the use of any tools. Finally, a means is provided for moving the blade between the open and closed positions.

4 Claims, 2 Drawing Sheets

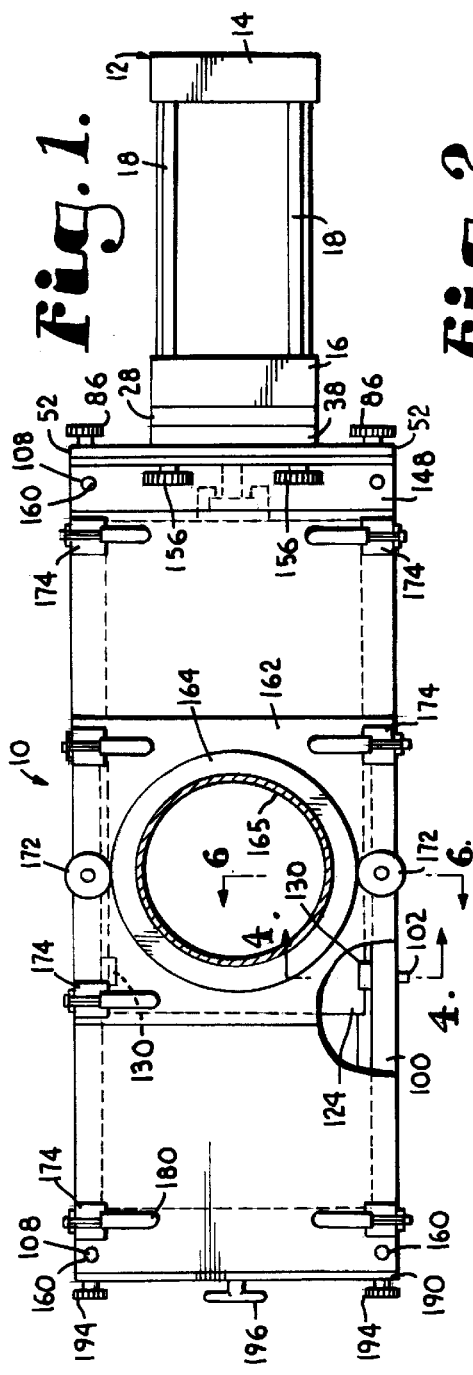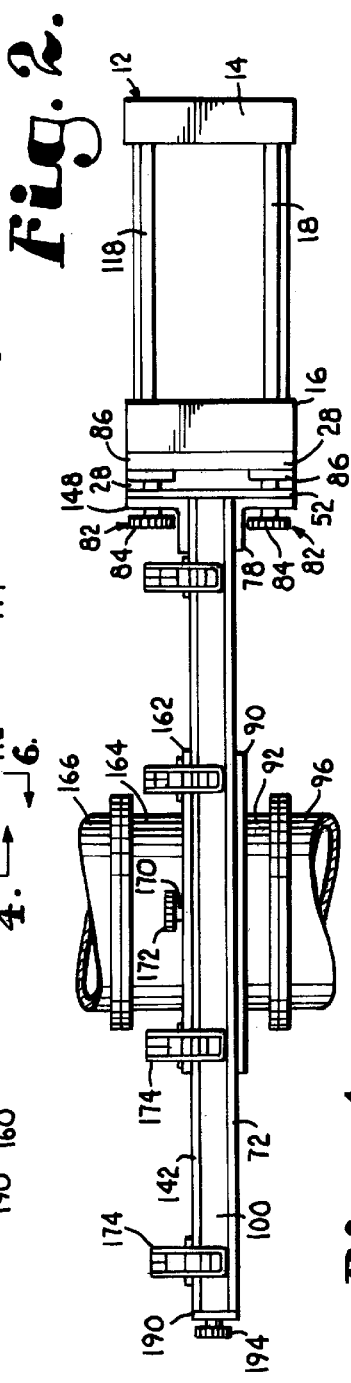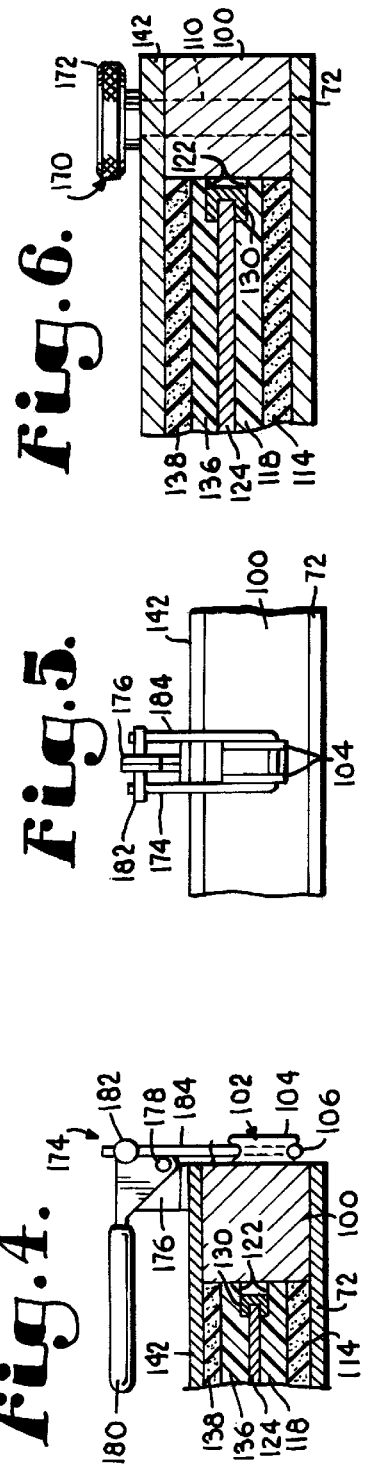

QUICK CLEAN ORIFICE GATE

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

This invention relates generally to gates for handling dry bulk material, and more particularly to an orifice gate valve which may be quickly disassembled, cleaned and returned to service.

There are five primary types of shut-off gates or valves used in handling dry bulk materials. These types include: slide knife gates, iris valves, butterfly valves, pinched valves and dome valves. Within the category of slide knife gates there are a number of different kinds of valves. Among the various types of slide knife gate valves are orifice gates, bull or bullet nose gates, square blade gates, and pivot blade gates. Most valves, including the bull or bullet nose slide knife gates, butterfly, pinch and dome valves, used in handling dry bulk material were originally designed to handle high-pressure liquids, gases and slurries. However, these gates or valves are routinely applied in dry material applications, with varying degrees of success. Because they were originally designed for high pressure liquids, many of the above gate valves have inherent design deficiencies incorporated therein when used for handling dry bulk material.

For example, the bull or bullet nose knife gate valves have a circular blade that will wedge or pack material to the sides and ends of the valve body when the gate closes. In other words, open cavities beside the blade exist where dry material can build up, causing material cross contamination. Material cross contamination can include a mixing of colors, a mixing of different compounds, and food spoilage. The open internal cavities existing within the bull or bullet nose knife gate valve are not a great concern when handling non-perishable liquids and gases, but ideally would be eliminated.

The pivoting blade gate valve, or swing valve, operates in a similar fashion to bull or bullet nose gate valves and also has open cavities that make it undesirable for handling food or materials where cross-contamination and cleanability are a concern. Further, the pivoting blade gate valve is structurally heavy, making it difficult to service and clean.

Dome valves have a domed disc which rotates into place to seal off the flow of material. While dome valves have less open cavities than other valves, they are also structurally heavy, making them more difficult to service and clean. Dome valves are also relatively expensive and require more head room to install as compared to other valves.

Pinch valves utilize an air controlled jacket or sleeve and are primarily used for handling slurries. The pinch valves are also structurally heavy and are problematic when the sleeve of the pinch valve wears through. Further, without a self-cleaning sliding action, material can build up on the bladder wall, leading to material cross contamination and spoilage concerns.

Butterfly valves offer the advantage of being relatively inexpensive and relatively clean. However, in a butterfly valve the disk allowing or preventing material flow, when in the open position, partially obstructs material flow and can allow material build up on the disk. This rotating disk can also be problematic as it pinches, rather than shears, material upon closure. This pinching can prevent full closure of the disk when desired. It can therefore be seen that many of the valves or gates currently in use present a number of drawbacks Orifice gates, such as that disclosed in U.S. Pat. No. 4,221,307 to Peterson, overcome many of the disadvantages of the gates and valves discussed above. More specifically, the orifice gate reduces or eliminates cavities where material can become lodged and remain trapped. Further, the orifice gate utilizes nylon seals which are resistant to abrasion. Because these seals are made from a hard polymer, they will not quickly abrade away as will rubber or soft packing. Moreover, these hard polymer seals are "live loaded" so that the seal is maintained and compensation is provided for wear. This live loading is accomplished by placing a natural or silicone rubber behind the seal to force it into contact with the blade. The orifice gate also offers the advantage of providing a cleaning of the blade upon opening and closing. This cleaning is achieved by the wiping of the blade against the hard polymer seals.

While the orifice gate discussed above overcomes many of the disadvantages of other types of gates and valves used in the handling of dry bulk materials, problems still exist. For example, in food applications, where bacteria or sticky material build up is a concern, cleanability is one of the most important considerations in the design and selection of a valve or gate. In nonfood applications, material cross contamination, such as with colored plastics or chemical compounds, cleanability is also a great concern. Thus far, none of the gates or valves discussed above, including the pre-existing orifice gate, have offered valves which can quickly be disassembled, cleaned and returned to service. For example, to service the prior art orifice gate, it must be completely unbolted, taken apart, cleaned and rebolted and reinstalled. This process is time consuming, due to the number and position of the bolts.

Therefore, an orifice gate is needed which can be quickly disassembled, cleaned and returned to service, while offering all of the existing advantages of an orifice gate.

BRIEF SUMMARY OF THE INVENTION

Accordingly, it is an object of the present invention to provide an orifice gate which can be quickly disassembled, cleaned and returned to service.

A further object of the invention is to provide an orifice gate which can be quickly disassembled without the use of tools.

Another object of the invention is to provide an orifice gate which is corrosion resistant.

A still further object of the invention is to provide an orifice gate in which the blade of the valve may be quickly removed from the air cylinder without the use of any tools.

According to the present invention, the foregoing and other objects are obtained by a specially constructed orifice gate for controlling the flow of a material. The orifice gate has first and second flange assemblies oriented adjacent to one another. Each of the flange assemblies has an opening through which the material can flow. A pair of load seals are placed between the flange assemblies and a pair of pressure plates are placed between the load seals. A blade is located between the pressure plates and has an opening therein which is sized similarly to the openings in the flange assemblies. The blade is movable between an open position such that the openings of the flange assemblies, pressure plates and load seals are aligned with the opening of the blade, and a closed position such that the opening of the blade is not aligned with the openings of the flange assemblies, pressure plates and load seals, so that material is prevented from flowing past the blade. The flange assemblies are coupled together with a coupling mechanism operable without the use of any tools. Finally, an actuator, such as an air cylinder, electric motor, handwheel or handcrank, is provided for moving the blade between the open and closed positions.

Additional objects, advantages, and novel features of the invention will be set forth in part in the description which follows, and in part will become apparent to those skilled in the art upon examination of the following, or may be learned from practice of the invention.

BRIEF DESCRIPTION OF THE SEVERAL VIEWS OF THE DRAWINGS

In the accompanying drawings which form a part of this specification and are to be read in conjunction therewith and in which like reference numerals are used to indicate like parts in the various views:

FIG. 1 is a top plan view of an orifice gate valve constructed according to a preferred embodiment of the invention, with parts being broken away to show particular details of construction;

FIG. 2 is a side elevation view of the orifice gate of FIG. 1;

FIG. 4 is an enlarged, partial side elevation view, taken generally along line 4—4 of FIG. 1;

FIG. 5 is an enlarged, partial side elevation view showing the releasable toggle clamps used on the orifice gate; and FIG. 6 is an enlarged, partial cross-sectional view taken generally along line 6—6 of FIG. 1.

DETAILED DESCRIPTION OF THE INVENTION

Figure 3:
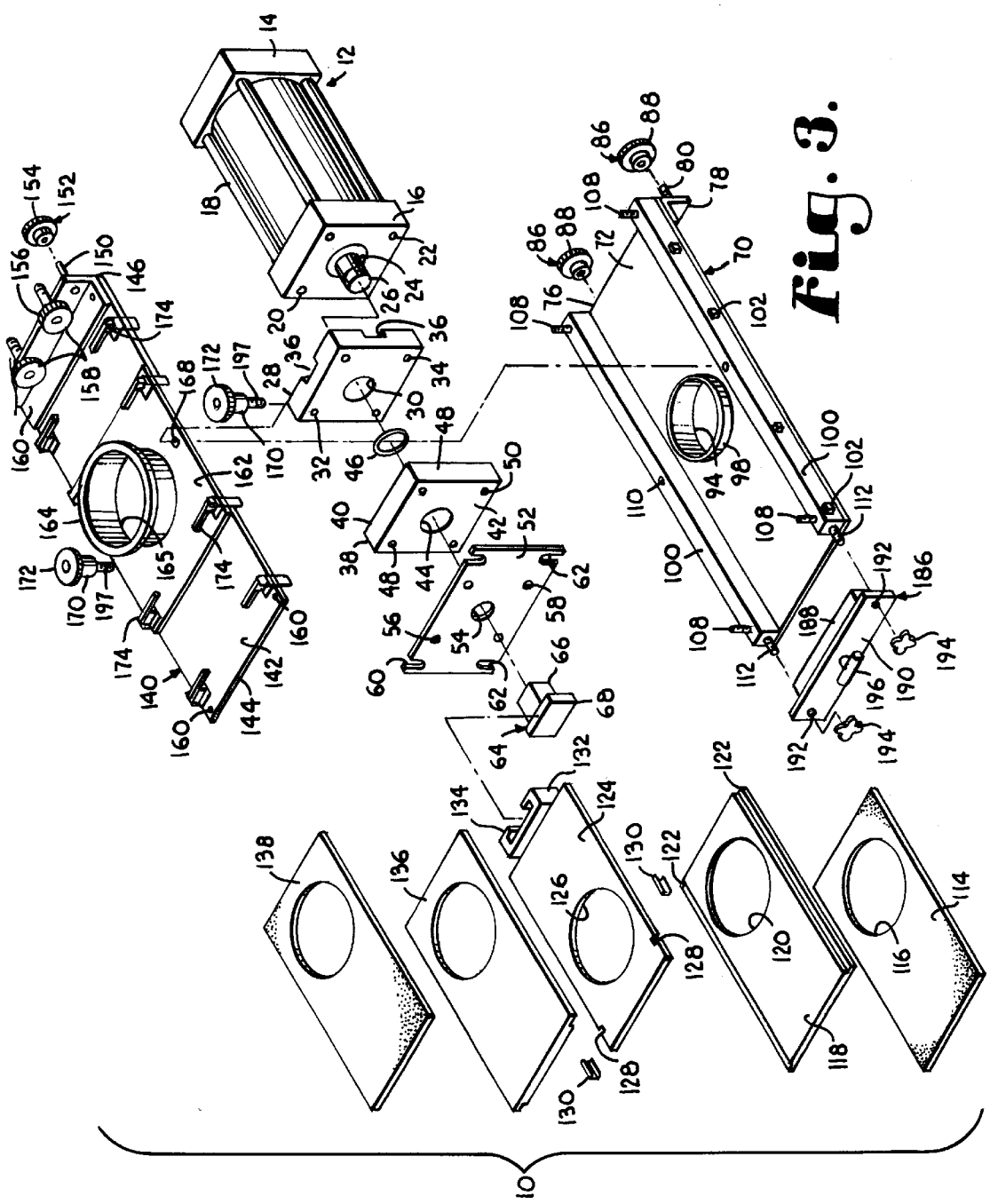
FIG. 3 is an exploded, perspective view of the orifice gate of FIG. 1.

An orifice gate embodying the principles of this invention is broadly designated in the drawings by the reference numeral 10. With initial reference to FIGS. 1, 2 and 3, orifice gate 10 is equipped with an air cylinder 12 that has a first end plate 14 and a second end plate 16. End plates 14 and 16 are generally square and are connected together with a series of tie rods 18. As best seen in FIG. 3, end plate 16 has a pair of upper threaded holes 20 and a pair of lower threaded holes 22. Air cylinder 12 further has a shaft 24 which is equipped with a threaded end 26. Shaft 24 reciprocates upon action of air cylinder 12, as is known in the art. Preferably, the main cylinder of air cylinder 12, and end plates 14 and 16 are made from 6061T6 aluminum for weight considerations. Tie rods 18 and shaft 24 are preferably made from 304 stainless steel. The air cylinder components may have exterior surfaces nickel plated for corrosion resistance. Air cylinder 12 thus operates as an actuator that reciprocates shaft 24. Other actuators may be used in place of air cylinder 12, such as an electric motor, a hydraulic cylinder, a handwheel or a handcrank.

Located adjacent end plate 16 is an air relief spacer 28. Spacer 28 is equipped with a central bore 30 which allows passage of cylinder shaft 24. Spacer 28 has a pair of upper through holes 32 which are in alignment with holes 20. Spacer 28 further has a pair of lower through holes 34 which are in alignment with holes 22. Spacer 28 is positioned against second end plate 16 and has a pair of relief channels 36 crossing the face abutting end plate 16. Channels 36 generally divide spacer 28 into four quadrants with one relief channel running from one side of spacer 28 to the other and the remaining relief channel running from the top of spacer 28 to the bottom.

Placed in abutting relationship with relief spacer 28 is a seal retainer spacer 38. Retainer spacer 38 has a first face 40 and a second face 42. Face 40 of retainer spacer 38 is placed in abutting relationship with relief spacer 28. Spacer 38 has a central bore 44 running therethrough that is in alignment with and of the same size as is bore 30 in relief spacer 28. Associated with bore 44 is a seal counter sink that is sized to allow an o-ring seal 46 to be placed therein. Seal 46 is sized to fit tightly about shaft 24 and will prevent any oil-laden air escaping from cylinder 12 from entering the valve portion of orifice gate 10. Channels 36 in spacer 28 allow any air escaping from cylinder 12 to vent to the surrounding environment, thus preventing unwanted air from entering the main valve body. Retainer spacer 38 has a pair of upper through holes 48 which are in alignment with holes 32 and a pair of lower through holes 50 which are in alignment with holes 34.

Placed in abutting relationship with second end 42 of retainer spacer 38 is a generally rectangular power plate 52. Plate 52 has an opening 54 which is in alignment with bores 30 and 44 to allow shaft 24 to pass therethrough. Generally, opening 54 is sized slightly larger than bores 30 and 44. Plate 52 has a pair of upper through holes 56 which are in alignment with upper holes 32 and 48. Plate 52 also has a pair of lower through holes 58 which are in alignment with lower holes 34 and 50. As can best be seen in FIGS. 1 and 3, plate 52 extends laterally beyond spacers 28 and 38. Near the outward edges of plate 52 beyond the width of spacers 28 and 38 are a pair of upper slots 60 and a pair of lower slots 62.

A t-shaped clevis insert 64 is coupled to shaft 24 adjacent the side of plate 52 that is opposite spacer 38. Insert 64 is preferably a one piece construction and has a connecting block 66 and a retaining member 68. Connecting block 66 has an internal threaded bore so that insert 64 may be threaded onto threaded end 26 of shaft 24. Preferably, clevis insert 64 is made from 304 stainless 20 steel.

A lower flange assembly 70 is removably coupled to plate 52. Flange assembly 70 has a base plate 72 which has a first end 74 and a second end 76. Rigidly connected to the second end 76 of plate 72 is an angle 78. Preferably angle 78 is bonded or sealed to plate 72 eliminating cracks and crevices. Welded to angle 78 and extending rearwardly therefrom is a pair of threaded rods 80 that are spaced to fit within lower slots 62. Rods 80 are of sufficient length to extend beyond the width of plate 52. Angle 78 also has a pair of through holes which are sized and spaced to be in alignment with lower holes 34, 50 and 58. As best seen in FIG. 2, a pair of retaining bolts 82 are placed through the lower through holes in angle 78, and through holes 34, 50 and 58. Bolts 82 are then threaded into holes 22 on end plate 16. Thus, retaining bolts 82 operate to couple flange assembly 70, plate 52, retainer spacer 38, relief spacer 28 and air cylinder 12 together. Bolts 82 are equipped with a hand knob 84 that allows them to be loosed and tightened using only hand pressure. Further connecting flange assembly 70 to plate 52 are a pair of retaining knobs 86. Knobs 86 have an internal threaded bore which mates with threaded rods 80. As described above, rods 80 are placed within slots 62. Thereafter, knobs 86 are secured to threaded rods 80 and operate to place a clamping pressure on plate 52. Knobs 86 are also equipped with hand knobs 88 so that they may be tightened and loosened using only hand pressure.

As best seen in FIG. 2, plate 72 has connected thereto a flange plate 90. Preferably, flange plate 90 is continuously welded to base plate 72 to eliminate cracks and crevices. Plate 90 is generally square in shape and may be equipped with a straight tube connection, or a flange for a bolted connection, or a ferrule type flange 92 as shown in FIG. 2. All three connections are known to those of skill in the art and may be used. Disposed through plates 72 and 90 is a material orifice 94. Orifice 94 allows material flow through orifice gate 10 to a material transport tube 96, as best seen in FIG. 2. Extending upwardly from base plate 72 and surrounding the perimeter of orifice 94 is a collar 98. Preferably, collar 98 is continuously welded to plate 72. The welded connections used in orifice gate 10 are continuously welded with a ³⁄₃₂ of an inch radius for ease of cleaning. Preferably, plates 72 and 90, flange 92, knobs 86 and bolts 82 are made from 304 stainless steel.

Rigidly secured to plate 72 and extending upwardly therefrom is a pair of square bars 100. Bars 100 extend from first end 74 to second end 76 of base plate 72. Preferably, bars 100 are continuously welded to plate 72. As best seen in FIGS. 3 and 4, extending outwardly from bars 100 are a series of toggle anchors 102. Each anchor 102 may be formed by pair of outwardly extending members 104 which are welded to bars 100. Each of the members 104 has an indentation 106 on its lower end, as best seen in FIG. 4.

Extending upwardly from bars 100 near each terminal end thereof is a positioning dowel 108. Dowels 108 facilitate alignment of the valve body during assembly, as is more fully described below. Each bar 100 also has a threaded hole 110 disposed through the assembly generally midway between its ends. Holes 110 aid in alignment of the valve body and cooperate to hold the upper and lower flange assemblies of valve 10 together. Bars 100 also each have a threaded end rod 112 extending outwardly therefrom adjacent first end 74 of base plate 72. Rods 112 operate to secure an end plate assembly to lower flange assembly 70, as is more fully described below.

Placed directly on top of plate 72 is a load seal 114 which has an orifice 116 disposed therein. Orifice 116 is sized to fit securely about collar 98. Further, orifice 116 is located within seal 114 so that it is offset from the center of the load seal. As best represented in FIG. 3, seal 114 is oriented so that it extends substantially to first end 74 of base plate 72.

Disposed on top of seal 114 is a pressure plate 118 which has an orifice 120 disposed therethrough. Orifice 120 is slightly larger than orifice 116 and is sized to slip fit or float about collar 98. Orifice 120 is located within plate 118 in a fashion corresponding to the location of orifice 116 within seal 114. Plate 118 thus extends substantially to first end 74 of base plate 72. A pair of grooves 122 run the length of plate 118 and are located on the side of plate 118 opposite seal 114. Grooves 122 operate as a guide mechanism for an orifice blade 124.

Orifice blade 124 is placed on top of plate 118 and is preferably made from 304 stainless steel. Blade 124 has an orifice 126 disposed therethrough which is sized to correspond to material orifices 116 and 120. Orifice 126 is located closer to one end of blade 124 than the other.

On the sides of blade 124 nearest orifice 126 is a pair of guide notches 128. Coupled to blade 124 using guide notches 128 is a pair of blade guides 130. Guides 130 have an extending tab which securely fits within notch 128 in a pressure-fit relationship. Guides 130 are sized to extend above and below blade 124 and will run within grooves 122 on plate 118, thus guiding blade 124 between the pressure plates.

Securely attached to blade 124 on the end distal from guides 130 is a clevis 132.

Preferably, clevis 132 is continuously welded to blade 124. Clevis 132 has a cavity 134 which matingly fits with retaining member 68 of clevis insert 64. When clevis 132 is placed over insert 64, blade 124 is connected to air cylinder 12 via cylinder shaft 24 eliminating the need to use any hand tools to remove the components. Therefore, as shaft 24 extends and retracts, blade 124 will also extend and retract.

Disposed on top of blade 124 is a pressure plate 136 which is constructed similarly to pressure plate 118 and oriented in mirrored symmetry thereto. Similarly, a load seal 138 is placed on top of pressure plate 136. Load seal 138 is similar in all respects to load seal 114 and is oriented in mirror symmetry to seal 114. Preferably, seals 114 and 138 are made from a closed cell resilient silicone rubber. The closed cell silicone rubber minimizes moisture absorption and is readily cleaned. Plates 118 and 136 are preferably made from PET, a polyester material that has good lubricity, chemical resistance, rigidity and does not absorb moisture.

Disposed on top of bars 100 and plate 136 is an upper flange assembly 140. Flange assembly 140 has a base plate 142 which has a first end 144 and a second end 146. Coupled to plate 142 adjacent second end 146 is an angle 148. Preferably, angle 148 is bonded to plate 142. Extending outwardly from angle 148 is a pair of threaded rods 150 which are spaced to correspond with upper slots 60 in plate 52. Flange assembly 140 is secured to plate 52 by placing rods 150 within slots 60 and securing a pair of threaded retaining knobs 152 onto rods 150. Knobs 152 are equipped with hand knobs 154 so that they may be tightened or loosened using only hand pressure. Angle 148 has a pair of through holes therein which are spaced to align with upper through holes 32, 48 and 56. A pair of retaining bolts 156 are placed through the holes in angle 148 as well as holes 32, 48 and 56 and are threaded into threaded holes 20 on first end plate 14. Retaining bolts 156 each have a hand knob 158 associated therewith so that they may be loosened or tightened utilizing only hand pressure. Slots 60 and 62 permit removal and replacement of plate 52 from lower flange assembly 70 and upper flange assembly 140 without full removal of knobs 86 and 152 if the flange assemblies are removed by lifting upwardly. Knobs 86 and 152 must be removed if the flange assemblies are removed by sliding them outwardly.

Disposed through base plate 142 adjacent first end 144, and through angle 148 and plate 142 adjacent second end 146, are a series of positioning holes 160 which are positioned to align with dowels 108. Dowels 108 and positioning holes 160 thus cooperate to align flange assembly 70 with flange assembly 140.

Rigidly secured to plate 142 is a flange plate 162, as best seen in FIGS. 1 and 3. Flange plate 162 is generally square in shape and is preferably continuously welded to plate 142. Welded to plate 162 is an upwardly extending flange 164. Flange 164, base plate 142 and flange plate 162 present a material orifice 165. Flange 164 may accommodate a straight-tube connection, a ferrule type connection, or a bolted flange connection, as is known to those in the art. However, if a bolted connection is used for flange 164 it may not also be substituted for the ferrule type connection 92 associated with flange assembly 70 or vice versa, if quick disassembly is desired without the use of tools. Flange 164 is used to couple a transport tube 166 to flange assembly 140. Preferably, base plate 142, flange plate 162, flange 164 and knobs 154 and bolts 156 are made from 304 stainless steel.

Located generally midway along each side of plates 142 and 162 is a through hole 168. Holes 168 align with holes 110 on bars 100. A pair of retaining knobs 170 with threaded studs 197 are threaded into holes 110. Knobs 170 act to couple and align flange assembly 140 with flange assembly 70. Retaining knobs 170 are also equipped with a hand knob 172 so that they may be tightened and loosened using only hand pressure. As best seen in FIG. 6, holes 110 go clear through the assembly so that there are no blind holes.

Spaced along, and rigidly secured to the top surface of base plate 142 and flange plate 162 is a series of toggle clamps 174 which are spaced to align with toggle anchors 102. As best seen in FIGS. 4 and 5, each toggle clamp 174 has a base 176 that is preferably continuously welded to the top of plates 142 and 162. A pivot pin 178 pivotally connects a handle 180 to base 176. Handle 180 is preferably coated with a rubberized material. Extending through handle 180 is a latch pin 182. Handle 180 is free to rotate about pin 182. Secured through each end of pin 182 is one leg of a u-shaped latch 184. In operation, latch 184 is placed in contacting relationship with toggle anchor 102, and more specifically within indentation 106. Thereafter, handle 180 is rotated about pin 178. As shown in FIG. 4, handle 180 would be rotated in a counter clockwise direction. Rotating handle 180 places an upward force on the lower portion of latch 184, and moves latch 184 into contacting relationship with anchor 102. Base 176 is equipped with a stop to prevent handle 180 from rotating beyond a desired point. Clamps 174 thus operate to secure flange assembly 70 to flange assemble 140.

Upon securing bolts 170 and clamps 174, flange assemblies 70 and 140 operate to compress seals 114 and 138. Upon compressing the load seals, pressure plates 118 and 136 are biased towards blade 124. This biasing force insures that blade 124 will be properly sealed. In other words, material flowing through orifice gate 10 will not enter the interior of orifice gate 10 because plates 118 and 136 will "wipe" the exterior surface of blade 124 as it enters or moves between the pressure plates.

Secured between flange assembly 70 and flange assembly 140 is an end plate assembly 186. Assembly 186 has a body 188 which fits between bars 100 on flange assembly 70.

Secured to body 188 is a top panel 190. Preferably, body 188 is bonded to panel 190. Panel 190 and body 188 are preferably made from 304 stainless steel. Panel 190 is sized to completely cover the opening formed by flange assembly 70 and flange assembly 140. Panel 190 has a pair of through holes 192 which are sized and spaced to accommodate rods 112. End plate assembly 186 is thus placed on rods 112 and is secured to flange assembly 70 with a pair of retaining knobs 194 which have an internal threaded hole to mate with threaded end rods 112. Knobs 194 may be operated using only hand pressure. Panel 190 also has a handle 196 extending therefrom. Handle 196 is generally t-shaped and operates to allow easy removal of assembly 180 from flange assembly 70.

As best seen in FIG. 2, orifice gate 10 can be secured to and between an upper transport tube 166 and a lower transport tube 96. In an open position, orifice 126 of blade 124 is positioned to align with material orifice 116 of seal 114 and 138 and orifice 120 of plates 118 and 136 and orifice 94 of base plate 72 and orifice 165 of base plate 142. Therefore, when blade 124 is in an open position, material can flow through orifice gate 10. When it is desired to prevent the flow of material through orifice gate 10, air cylinder 12 is activated to extend shaft 24. Extending shaft 24 operates, through clevis insert 64 and clevis 132 to extend blade 124. Movement of blade 124 in this manner operates to take orifice 126 out of alignment with orifices 94, 116, 120 and 165, thus preventing the flow of material through orifice gate 10. Because pressure plates 118 and 136 are biased towards blade 124 by seals 114 and 138, the material being transported will be prevented from entering the valve body between pressure plates 118 and 136 by the "wiping" action achieved by the pressure plates. It can therefore be seen that the orifice gate has no open cavities in which material can become packed, and thus reduces risks of cross-contamination and spoilage. Any material entering orifice 126 between plates 118 and 136 in the closed position is mechanically cleared out of the valve on the subsequent opening stroke.

Orifice gate 10 allows the user to quickly and easily check the cleanliness of the valve while it is in use. The user simply removes end plate assembly 186 from orifice gate 10 and can visually check to determine if material has entered the interior of the orifice gate. This is done simply by removing knobs 194 from rods 112. After knobs 194 have been removed, the user simply grabs handle 196 to remove end plate assembly 186 from orifice gate 10. After the valve has been inspected, end plate assembly 186 is secured back in place with knobs 194 and rods 112.

Assembly 186 can be gasketed between assembly 70 to create a pressure seal. Further, surfaces between assembly 70 and assembly 140 can be gasketed to create a pressure seal. Similarly, surfaces between plate 52 and assemblies 70 and 140 can be gasketed to create a pressure seal. The use of gasket creates a pressure seal between the components, thus preventing unwanted material from entering the body of the valve. A compressed air fitting may be installed on assembly 70 to allow the introduction of compressed air or gas into the body of the valve. A higher air pressure in the valve body will purge materials existing in the body of the valve into the internal orifice as components wear.

As can be seen from the above description, orifice gate 10 is constructed to eliminate the open cavities existing in other types of shut-off gates or valves, provide a mechanical cleaning action, and is constructed to provide an orifice gate which can be quickly disassembled, cleaned and returned to service without the use of any hand tools. More specifically, to disassemble orifice gate 10, it is disconnected from transport tubes 96 and 166. It is possible to remove valve 10 from only one transport tube, while retaining the ability to disassemble and clean the valve. Thereafter, retaining bolts 156 are first loosened by rotating hand knobs 158. Bolts 156 are then completely removed from spacers 28 and 38, as well as plate 52 and upper flange assembly 140. Retaining knobs 152 are then loosened by rotating hand knobs 154, thus loosening upper flange assembly 140 from plate 52.

Retaining knobs 170 are then loosened by rotating knob 172. Preferably, knobs 170 are rotated approximately one-half of a turn. After loosening knobs 170, clamps 174 are released by rotating handle 180 upwardly away from flange assembly 140. After loosening, latch 184 is removed from its contacting relationship with toggle anchors 102. After toggle clamps 174 have been loosened, retaining knobs 170 may be completely removed.

End plate assembly 186 is then removed by loosening and removing retaining knobs 194 from their position on threaded rods 112. At this point, upper flange assembly 140 may be removed by lifting assembly 140 from its position on dowels 108. It should be noted that dowels 108 are optional, and if dowels 108 are not used flange assembly 140 may be removed without lifting by sliding the assembly laterally outward. After flange assembly 140 is removed, seal 138 and plate 136 are removed by lifting upwardly.

Blade 124 may then be removed from orifice gate 10 simply by lifting upwardly. In lifting upwardly, clevis 132 slides relative to clevis insert 164. After removal of blade 124, plate 118 and seal 114 may be removed by lifting upwardly.

To remove lower flange assembly 70, knobs 86 are loosened from their position about rods 80. Bolts 82 are then removed from their position in holes 20, and are removed from spacers 28 and 38, plate 52 and angle 78, allowing flange assembly 70 to be removed from contact with plate 52.

After flange assembly 70 has been removed, clevis insert 64 may be unthreaded from its position about shaft 24. Thereafter, plate 52, spacer 38, and spacer 28 may be removed from their positions adjacent air cylinder 12. After all the components have been disassembled, the entire assembly may be thoroughly cleaned and reinstalled by reversing the above procedure. Therefore, the entire assembly and disassembly of orifice gate 10 can be accomplished without the use of any hand tools.

From the foregoing, it will be seen that this invention is one well adapted to obtain all of the ends and objects hereinabove set forth, together with other advantages which are inherent to the structure. It will be understood that certain features and subcombinations are of utility and may be employed without reference to other features and subcombinations. This is contemplated by and within the scope of the claims.

Since many possible embodiments may be made of the invention without departing from the scope thereof, it is to be understood that all matters herein set forth or shown in the accompanying drawings is to be interpreted as illustrative and not in a limiting sense.

Having thus claimed the invention, what is claimed is:

1. A gate valve for controlling the flow of a solid particulate material, the valve comprising:

a first flange assembly presenting an opening through which the material can flow;

a second flange assembly adjacent said first flange assembly and presenting an opening aligned with the opening of said first flange assembly and through which the material can flow;

a pair of load seals disposed between said first and second flange assemblies;

a pair of pressure plates disposed between said load seals;

a blade presenting an opening, said blade disposed between said pressure plates and movable between an open position wherein the opening of said blade is aligned with the openings of the first and second flange assemblies, and a closed position wherein the opening of said blade is not aligned with the openings of said first and second flange assemblies so that material cannot flow past said blade;

a plurality of quick release clamps in combination with a plurality of bolts, said clamps and bolts coupling said first flange assembly to said second flange assembly, said clamps and bolts being applicable and releasable by hand to allow coupling and uncoupling of said first and second flange assemblies by hand without the use of tools, said bolts having a hand knob thereon that may be tightened to a required degree solely by hand pressure; and means for effecting movement of said blade between said open and said closed positions.

2. The gate valve of claim 1, wherein said clamps and said bolts operate to compress said load seals, so that said load seals bias said pressure plates against said blade.

3. The gate valve of claim 2, wherein said blade movement means comprises:

an actuator having an extendable shaft;

a clevis insert coupled to one end of said shaft;

a clevis rigidly secured to said blade, said clevis having a cavity formed therein to matingly receive said clevis insert;

wherein said blade is removably coupled to said actuator, by coupling said clevis and said clevis insert together.

4. The gate valve of claim 3, further comprising:

a relief spacer coupled to said actuator, said relief spacer having a hole disposed therethrough;

a retainer spacer placed in abutting relationship with said relief spacer, said retainer spacer having a hole disposed therethrough in alignment with said hole in said relief spacer; and a seal disposed between said relief spacer and said retainer spacer and being substantially adjacent said holes in said relief spacer and said retainer spacer;

wherein said shaft of said actuator travels through said holes in said relief spacer and said retainer spacer, and wherein said seal prevents unwanted air from entering the space between said first and second flange assemblies.

* * * * *